(12) United States Patent
Erden et al.

(10) Patent No.: US 8,824,249 B2
(45) Date of Patent: Sep. 2, 2014

(54) LIGHT SOURCE POWER CONTROL FOR HEAT ASSISTED MAGNETIC RECORDING (HAMR)

(71) Applicant: Seagate Technology LLC, Scotts Valley, CA (US)

(72) Inventors: Mehmet Fatih Erden, St. Louis Park, MN (US); Edward Charles Gage, Lakeville, MN (US); Darren W. Karns, Evans Cty, PA (US); Yimin Niu, Eden Prairie, MN (US); Kaizhong Gao, Shoreview, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 13/932,777

(22) Filed: Jul. 1, 2013

(65) Prior Publication Data

US 2013/0294207 A1    Nov. 7, 2013

Related U.S. Application Data

(63) Continuation of application No. 13/033,331, filed on Feb. 23, 2011, now Pat. No. 8,477,569.

(60) Provisional application No. 61/307,125, filed on Feb. 23, 2010.

(51) Int. Cl.
| | |
|---|---|
| *G11B 11/00* | (2006.01) |
| *G11B 13/04* | (2006.01) |
| *G11B 5/02* | (2006.01) |
| *G11B 5/455* | (2006.01) |
| *G11B 5/60* | (2006.01) |
| *G11B 5/00* | (2006.01) |

(52) U.S. Cl.
CPC ........ *G11B 13/04* (2013.01); *G11B 2005/0021* (2013.01); *G11B 5/02* (2013.01); *G11B 2005/001* (2013.01); *G11B 5/455* (2013.01); *G11B 5/6088* (2013.01)
USPC ..................................... 369/13.26; 369/13.28

(58) Field of Classification Search
USPC .......... 369/13.26, 13.27, 13.32, 13.33, 13.13, 369/116, 47.5, 47.51, 13.28, 13.29, 13.3, 369/13.31
See application file for complete search history.

(56) References Cited

U.S. PATENT DOCUMENTS

| | | | |
|---|---|---|---|
| 5,341,359 A * | 8/1994 | Birukawa et al. .......... | 369/53.15 |
| 5,495,463 A | 2/1996 | Akagi et al. | |
| 5,898,655 A | 4/1999 | Takahashi | |
| 5,982,714 A | 11/1999 | Koda | |
| 6,278,667 B1 * | 8/2001 | Belser ....................... | 369/13.01 |
| 6,557,126 B1 | 4/2003 | Kelly | |
| 6,603,619 B1 | 8/2003 | Kojima et al. | |

(Continued)

*Primary Examiner* — Tan X Dinh
(74) *Attorney, Agent, or Firm* — Hall Estill Attorneys at Law

(57) ABSTRACT

Apparatus and method for light source power control during the writing of data to a storage medium. In accordance with various embodiments, a data recording head is provided having a magnetic transducer and a light source. The light source is driven at a first power level to irradiate an adjacent storage medium prior to the writing if data to the medium using the magnetic transducer. The first power level is insufficient to alter a magnetization state of the medium. The light source is subsequently transitioned to a higher, second power level to irradiate the storage medium during the writing of data to said medium using the magnetic transducer, the second power level being sufficient to alter said magnetization state of the medium.

23 Claims, 10 Drawing Sheets

(56) References Cited

U.S. PATENT DOCUMENTS

| | | |
|---|---|---|
| 6,845,071 B2 * | 1/2005 | Shoji et al. .......... 369/47.53 |
| 7,099,096 B2 | 8/2006 | Ueyanagi |
| 7,099,251 B2 | 8/2006 | Naoi et al. |
| 7,227,823 B2 | 6/2007 | An |
| 7,248,554 B2 | 7/2007 | Nagano et al. |
| RE39,952 E | 12/2007 | Inkuchi et al. |
| 7,515,372 B2 | 4/2009 | Erden et al. |
| 7,609,480 B2 | 10/2009 | Shukh et al. |
| 7,626,894 B2 | 12/2009 | Bedillion et al. |
| 7,665,102 B2 | 2/2010 | Taguchi et al. |
| 2002/0021641 A1 | 2/2002 | Miyabata et al. |
| 2002/0027835 A1 | 3/2002 | Takagi et al. |
| 2002/0041539 A1 | 4/2002 | Kimura et al. |
| 2003/0214886 A1 | 11/2003 | Sakamoto et al. |
| 2006/0024529 A1 | 2/2006 | Murakami |
| 2006/0114590 A1 | 6/2006 | Hamaguchi et al. |
| 2007/0103807 A1 * | 5/2007 | Yang .......... 360/66 |
| 2007/0140070 A1 | 6/2007 | Verschuren |
| 2007/0230012 A1 | 10/2007 | Erden et al. |
| 2009/0207519 A1 | 8/2009 | Erden et al. |
| 2010/0002330 A1 * | 1/2010 | Lille .......... 360/59 |

\* cited by examiner

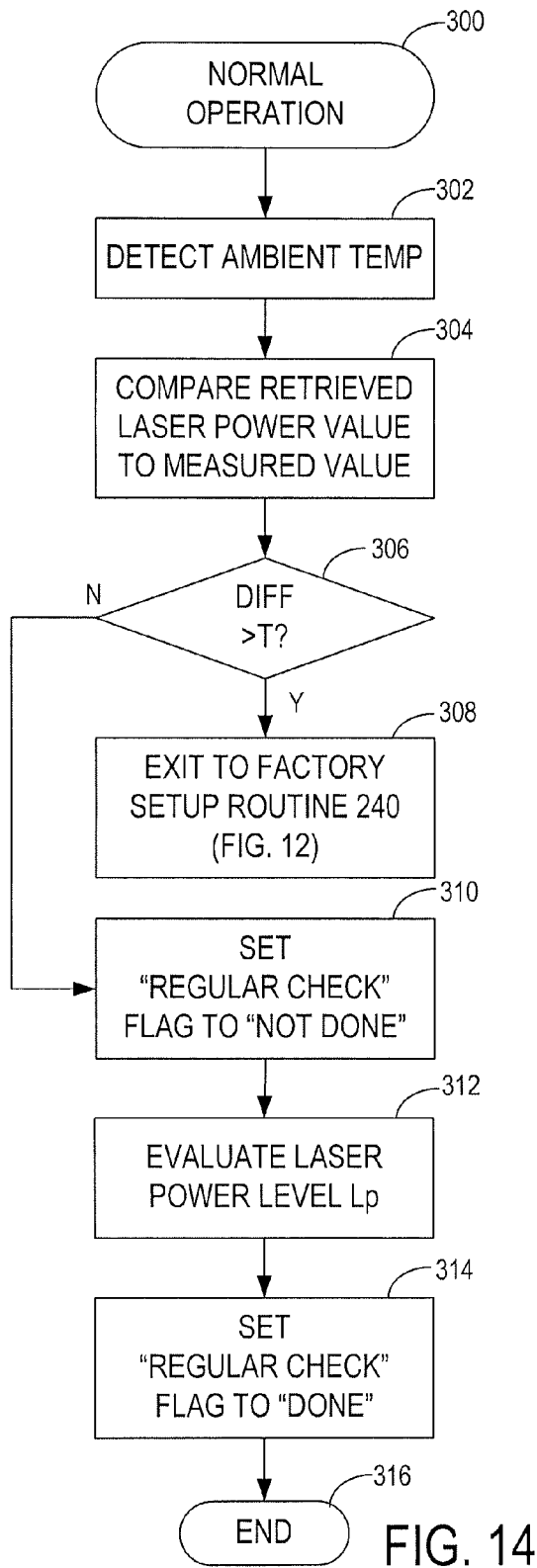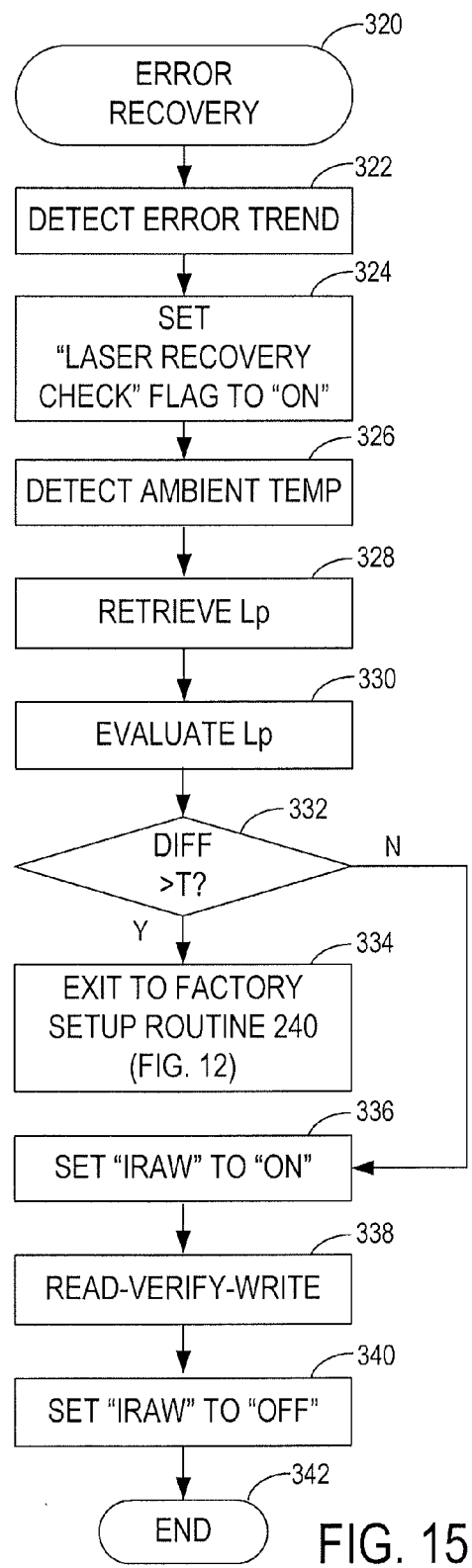
FIG. 14
FIG. 15

US 8,824,249 B2

LIGHT SOURCE POWER CONTROL FOR HEAT ASSISTED MAGNETIC RECORDING (HAMR)

RELATED APPLICATION

This application is a continuation of U.S. patent application Ser. No. 13/033,331 filed Feb. 23, 2011 (issuing on Jul. 2, 2013 as U.S. Pat. No. 8,477,569) which claims the benefit of U.S. Provisional Patent Application Ser. No. 61/307,125, filed Feb. 23, 2010, and titled "Laser Driver And Laser Power Control For Heat Assisted Magnetic Recording (HAMR)", which is hereby incorporated by reference.

BACKGROUND

Heat assisted magnetic recording (HAMR) generally refers to the concept of locally heating a recording media to reduce the coercivity of the media so that an applied magnetic write field can more easily change the magnetization direction of the media during the temporary magnetic softening of the media caused by the heat source. A tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

The principles of HAMR are based on i) choosing a medium with very high coercivity to ensure that the medium still satisfies the superparamagnetic limit with very small grain volumes, and ii) reducing the coercive field during the write process by heating the medium, for example, with a focused laser beam. When the magnetic medium is heated, the coercivity is reduced making writing possible. Then, after writing the bit, the medium cools back to its original temperature with high coercivity allowing the medium to be thermally stable.

SUMMARY

Various embodiments of the present invention are generally directed to light source power control during the writing of data to a storage medium.

In accordance with some embodiments, a data recording head is provided having a magnetic transducer and a light source. The light source is driven at a first power level to irradiate an adjacent storage medium prior to the writing if data to the medium using the magnetic transducer. The first power level is insufficient to switch a magnetization state of the medium. The light source is subsequently transitioned to a higher, second power level to irradiate the storage medium during the writing of data to said medium using the magnetic transducer, the second power level being sufficient to switch the magnetization state of the medium.

These and various other features and advantages of the various embodiments of the present invention can be understood from a review of the following detailed description section in conjunction with the accompanying drawings.

BRIEF DESCRIPTION OF DRAWINGS

FIG. 14 is a flow chart for a NORMAL OPERATION routine that can be carried out to adjust the laser power levels during normal device operation.

FIG. 15 is a flow chart for an ERROR RECOVERY routine that can be carried out to adjust the laser power levels responsive to an error detection event.

DETAILED DESCRIPTION

Figure 1:
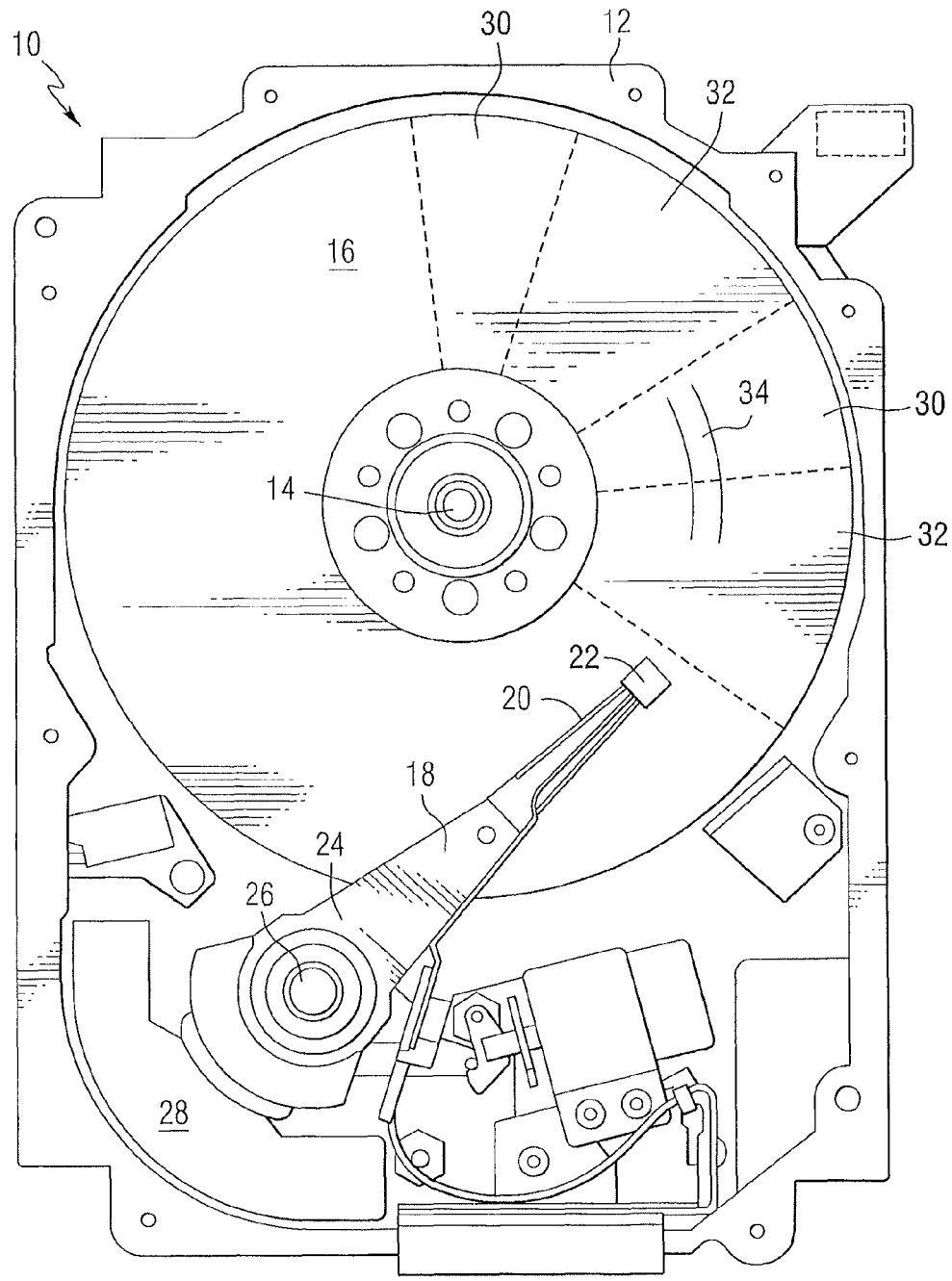
FIG. 1 is a pictorial representation of a data storage device constructed and operated in accordance with various embodiments of the present invention.

Referring to the drawings, FIG. 1 is a pictorial representation of a data storage device 10 that can be constructed and operated in accordance with various embodiments of the present invention. The device 10 is characterized as a disc drive and includes a housing 12 (with the upper portion removed and the lower portion visible in this view) sized and configured to enclose the various components of the disc drive. The disc drive includes a spindle motor 14 for rotating at least one data storage medium 16 within the housing. The medium 16 is characterized as a magnetic disc, although other forms of media may be used as desired.

At least one actuator arm 18 is provided within the housing 12, with each arm 18 having a first end 20 which supports a transducer in the form of a recording and/or reading head or slider 22. An opposing second end 24 of each actuator arm 18 is pivotally mounted on a shaft by a bearing 26. An actuator motor, which may be a voice coil motor (VCM) 28, is located at the arm's second end 24, for pivoting the arm 18 to position the head 22 to a desired position. The disc 16 includes a plurality of servo sectors 30 arranged between a plurality of data sectors 32. The data and servo sectors can be aligned along a plurality of concentric tracks 34.

Figure 2:
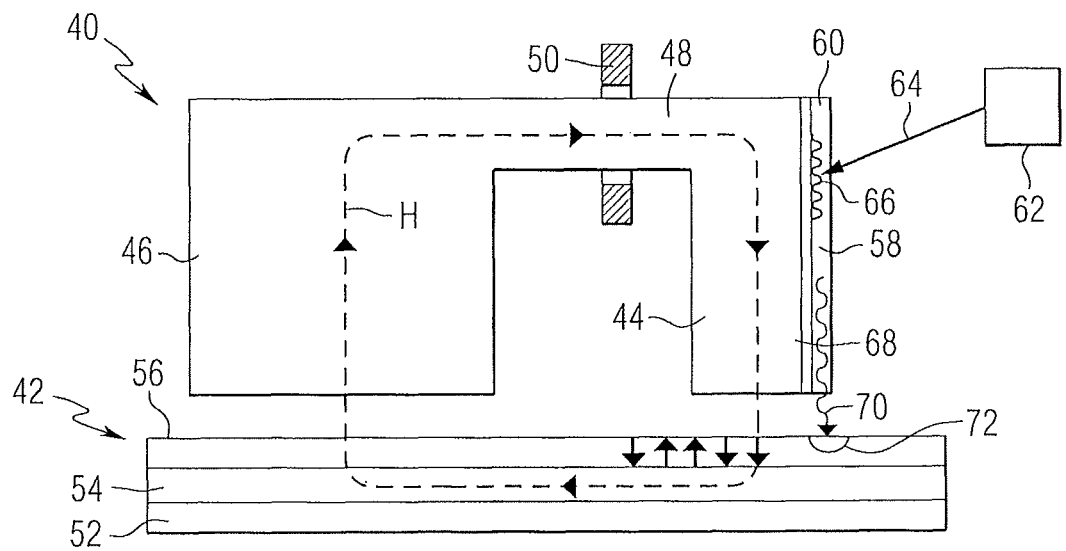
FIG. 2 is a schematic representation of a recording head and storage medium.

FIG. 2 is a schematic representation of read/write transducer (head) 40 in combination with a magnetic recording medium 42 to illustrate several components of a heat assisted magnetic recording (HAMR) system suitable for use in the device 10 of FIG. 1. FIG. 2 shows a perpendicular magnetic recording head and a perpendicular magnetic recording medium. It will be appreciated that this is merely illustrative and not limiting, as the various embodiments presented herein can be used in conjunction with other types of recording heads and/or recording media where it may be desirable to employ heat assisted recording.

The recording head 40 in this example includes a writer section comprising a main write pole 44 and a return or opposing pole 46 that are magnetically coupled by a yoke or pedestal 48. A magnetization coil 50 surrounds the yoke or pedestal 48 for energizing the recording head 40. The recording head 40 may also include a read element (not separately shown), which may be any suitable type of read sensor such as a magneto-resistive or spin-torque sensor.

Still referring to FIG. 2, the recording medium 42 is shown to include a substrate 52 which may be made of any suitable material such as ceramic glass or amorphous glass. A soft magnetic underlayer 54 is deposited on the substrate 52, and a hard magnetic recording layer 56 is deposited on the soft underlayer 54, with perpendicular oriented magnetic domains disposed in the hard layer 56. Any number of suitable materials can be used for the respective magnetic layers 54, 56. Other media configurations can be used.

The recording head 40 further includes a heating assembly comprising a planar waveguide 58 that directs light received from a light source 62 onto a surface of the recording medium 42 to heat the medium proximate to where the write pole 44 applies a magnetic write field H to the medium. The planar waveguide includes a light transmitting layer 60. The optical waveguide 58 acts in association with a light source 62 which transmits light, for example, via an optical path 64 that is coupled to the optical waveguide 58 by a coupling mechanism, such as a grating 66.

The light source 62 may be, for example, a laser diode or other suitable source of electromagnetic (EM) radiation that is mounted on or in the recording head 40. Such arrangement provides for the generation of a guided mode that propagates through the optical waveguide 58 toward the recording medium. EM radiation, generally designated by reference number 70, is transmitted from the waveguide 58 to irradiate a localized region 72 of the recording medium 42. This heats the localized region sufficient to alter the magnetic coercivity thereof sufficient and permit data to be written to the recording layer 56.

The magnetic recording medium 42 can be formatted in any number ways in preparation for the storage of data from the recording head 40. In some embodiments, the medium can be characterized as pre-printed bit patterned media (BPM) in which individual magnetically responsive bits (cells) are formed during a media fabrication process. In other embodiments, the medium has a continuous layer of magnetically responsive material that is processed using a servo track writer (STW) to define servo tracks which are then used to locate the writing of the user data by the recording head.

Figure 3:
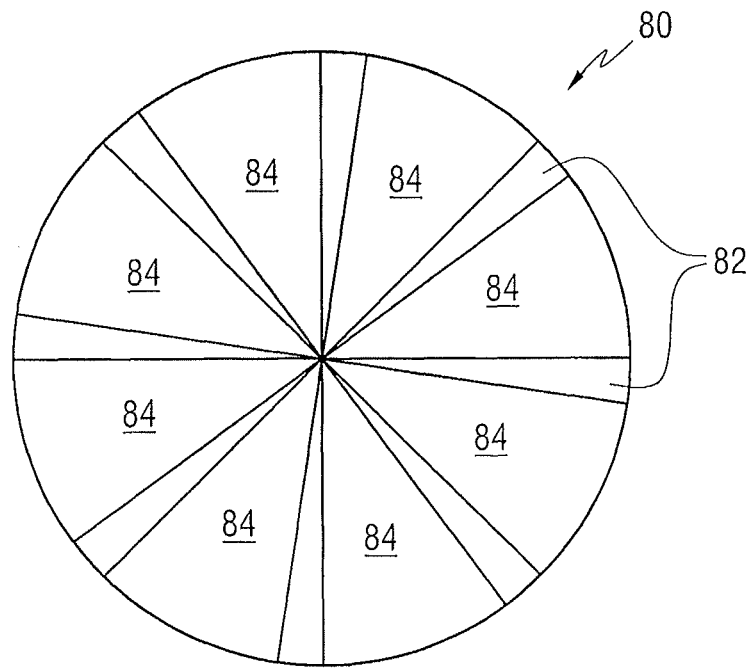
FIG. 3 is a schematic representation of a storage medium.

To give a concrete example, FIG. 3 is a schematic representation of an exemplary STW formatted storage medium 80 arranged to include servo fields 82 and data fields 84 positioned in wedges on the medium. The magnetic recording system extracts the head position information relative to the data sectors from the servo data written on the servo wedges, writes encoded user data to specific locations in the data fields using a write head during a data write operation, and reads encoded user data from specific locations in the data fields using a read head during a data read operation.

Figure 4:
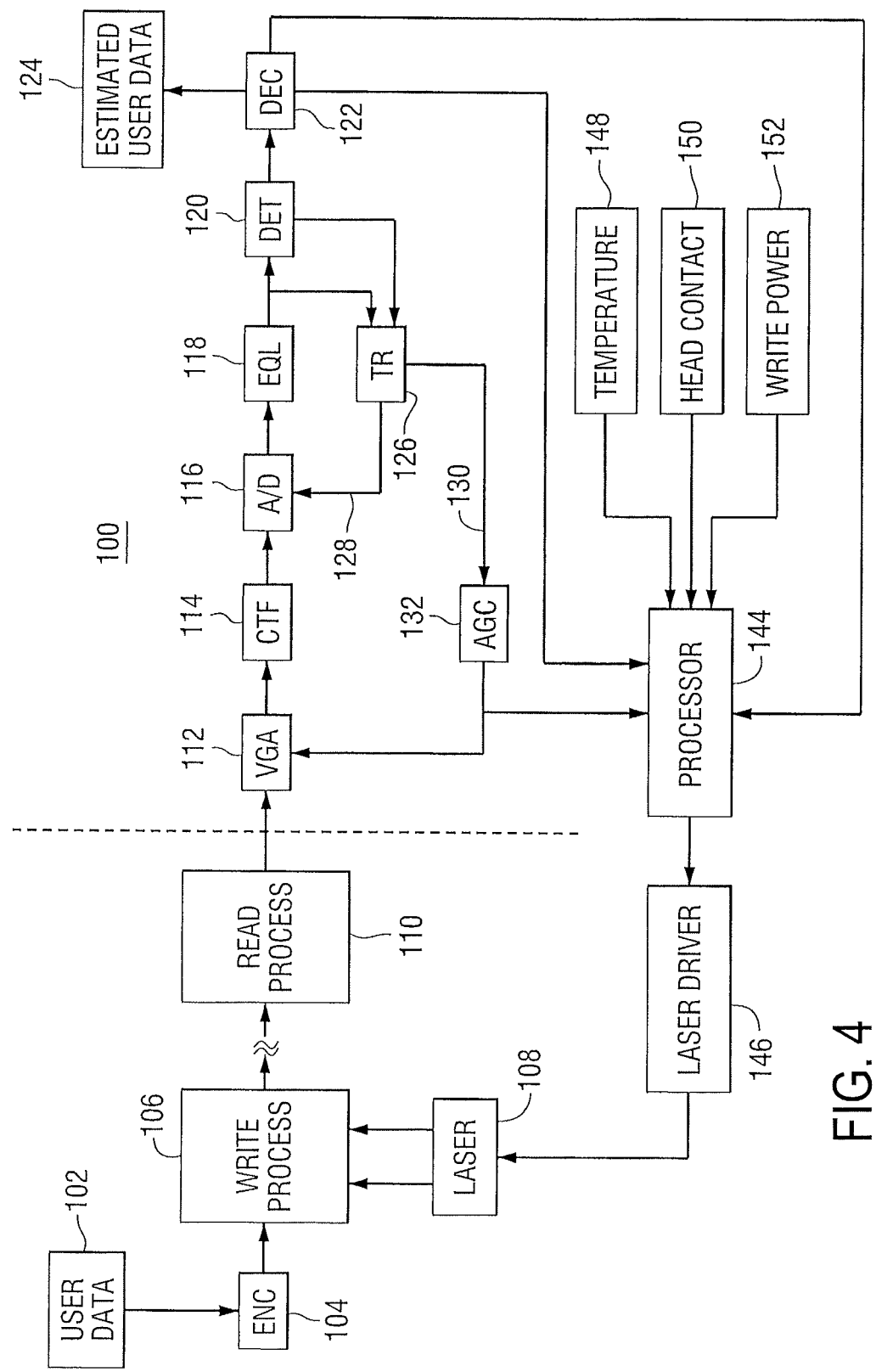
FIG. 4 is a functional block diagram of a recording system constructed in accordance with some embodiments of the present invention.

FIG. 4 is a schematic diagram of relevant portions of a recording system 100 that can be constructed in accordance with some embodiments of the invention. User data 102 to be recorded by the system are input to an encoder 104 and subjected to a HAMR write process 106. During writing, a laser 108 is used to heat a recording medium (within HAMR write process block 106, not explicitly shown in this figure) to temporarily reduce the coercivity of the medium.

When the stored data are to be subsequently retrieved, a read head produces a read signal in a read process 110 that employs a read (data recovery) channel. The read signal is passed to a variable gain amplifier 112, filtered in a continuous time filter 114 and converted to a digital signal in an analog-to-digital converter 116. The digital signal is equalized with an equalizer 118 and passed to a detector 120 for a subsequent decoder 122 to produce an estimate of the user data 124. A timing recovery circuit 126 receives signals from the equalizer output and the detector to produce a signal on line 128 that controls the analog-to-digital converter. The timing recovery circuit also produces a signal on line 130 that is used by an adaptive gain controller 132 to control the variable gain amplifier 112.

Figure 5:
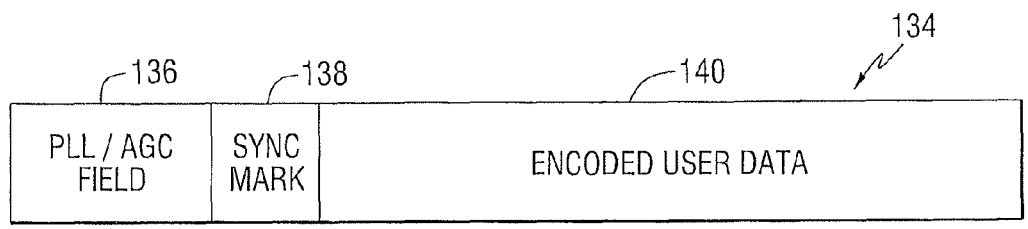
FIG. 5 is a schematic representation of a user data sector.

In the system of FIG. 4, the laser produces light that is used to heat a portion of the medium while writing the encoded user data to the medium. During the read process, analog readback signals are produced by the read head and sent to the read channel. The encoded user data is processed as sector-by-sector data. An exemplary sector format 134 is shown in FIG. 5.

During the read process, the readback signal corresponding to the "PLL/AGC Field" 136 at the beginning of each sector can be used to adjust both the gain of the variable gain amplifier (VGA) through the adaptive gain controller (AGC) and also the sampling instants for the analog-to-digital converter (A/D) through the timing recovery (TR) block in FIG. 4. The outputs of the AGC and timing recovery blocks estimate the average signal amplitude and the phase of the noisy readback signal obtained after the read process. Then, the readback signal corresponding to the "Sync Mark" field 138 is processed to make sure that the system can detect the known pattern written at that field. Once the sync mark is detected, the read channel architecture is assumed to be ready to process the encoded user data 140.

In accordance with various embodiments of the present invention, the system 100 of FIG. 4 operates to identify appropriate laser power levels for various operating scenarios of the recording device. In some embodiments, a processor 144 may use the output of the detector or decoder blocks, as well as other system information, in establishing the appropriate laser power levels. These values may be stored in a suitable memory location such as a look up table, or an empirical relationship can be established and used to calculate appropriate laser power levels on the fly.

The laser power levels obtained by the processor 144 are subsequently used to control a laser driver 146 that modulates the laser 108. As explained below, different laser power levels may be used for different operational modes of the system, as well as for different head/disc combinations, media zones, ambient temperature conditions, write power levels, detected readback characteristics, and so on.

In accordance with some embodiments, the laser driver adjusts the laser power based on the mode of operation to be performed in the data storage device. For example, during a read operation, the laser may be turned completely off. During a write operation, the laser diode may be modulated between multiple power levels, such as a relatively higher level used during the actual writing of data to the user data sectors and another, relatively lower level used when the head is not actually writing data, such as when the data passes adjacent the servo data in the embedded servo data sectors or other user data sectors that immediately precede the selected sector being written.

When the data storage device is in a read mode operation, there is generally little need to turn on the laser. Indeed, applying sufficient power to the laser to affect the coercivity of the medium during a read operation might undesirably result in the overwriting of existing user data or control data on the medium. Thus, in some embodiments the laser is turned completely off during the readback of user data. Alternatively, the laser may be intermittently or continuously maintained at a relatively low power level during the readback of user data, provided the applied power level is insufficient to affect the recorded state of the media.

In preparation for a write mode operation, the laser can be driven at a first lower power level when not writing, e.g., when over servo sectors, format areas or other user data sectors not being written, and then driven at a second higher power level for actual writing. By turning the laser on for a period of time prior to writing, the laser is brought to an initial power and temperature, and can then be rapidly brought up to the desired power level for writing.

Figure 6:
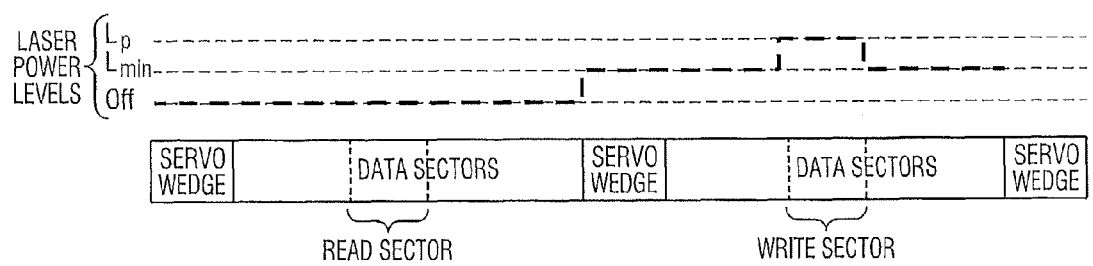
FIG. 6 is a schematic representation of laser power levels during read and write operations.

FIG. 6 is a schematic representation of exemplary laser power levels applied to the laser in accordance with some embodiments. In FIG. 6, the system is configured to carry out a read operation to read a first sector ("READ SECTOR"), followed by a write operation to write data to a second sector ("WRITE SECTOR"). While both sectors are shown to be on the same track, such is merely for purposes of illustration and is not limiting.

Three different laser power levels are shown to be applied to the laser at different times. An "Off" level corresponds to no (or minimal) power applied as the head passes adjacent the first servo wedge and the READ SECTOR. A laser value "Lp" is used as the head passes adjacent the WRITE SECTOR and is high enough to alter the coercivity of the medium to effect the switching of the magnetization state thereof to write data to the sector. An intermediate laser value "Lmin" is used at other times, including as the head passes adjacent the second servo wedge and over the data sectors immediately preceding the WRITE SECTOR. The laser power may be continuously maintained at the higher Lp value as the write data sector passes adjacent the head. Alternatively, the laser power may be pulsed as the WRITE SECTOR passes adjacent the head. For example, the laser power may be transitioned to the Lp value for the writing of each bit in the WRITE SECTOR, followed by a return of the laser power to the lower Lmin value (or some other value) between each written bit in the sector.

The Lmin value is a minimum laser power value that is set low enough so that the magnetization state of the portion of the media that is irradiated by the laser is not switched, but at the same time it is set high enough to reduce the time required to transition from Lmin to Lp required for writing. The Lmin laser power value can be predetermined based on a priori knowledge of the HAMR system, or may be empirically determined. It is contemplated, albeit not required, that a common Lmin value will be used for all heads during each write operation, although different Lmin values can be determined as desired. The Lmin value(s) can also be adjusted over time to take into consideration laser wear and other factors.

Figure 7:
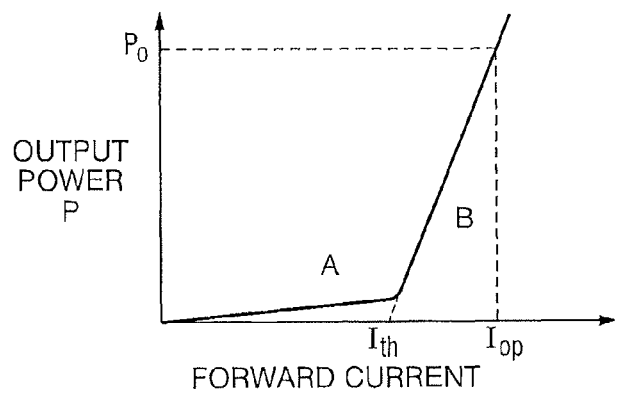
FIG. 7 is a graph of laser power versus drive current.

FIG. 7 is a graphical representation of laser power versus drive current. In FIG. 7, region A represents a laser diode emitting region, and region B represents the laser oscillating region. The transition between the two region occurs at a threshold current Ith. In some embodiments, the minimum laser power Lmin can be established by applying a laser current near the threshold current Ith. In one example, Lmin could be set to 1 mW so that media heating is very small but the laser is above its threshold and turn on times can be less than 1 nanosecond.

The Lp laser power value from FIG. 6 can be determined in a number of ways in accordance with various embodiments, as will now be discussed. Generally, to promote an optimized and stable recording system, the laser power value Lp can be adjusted at appropriate times, such as during initial device manufacturing, during device initialization, and at various times during device operation.

Figure 8:
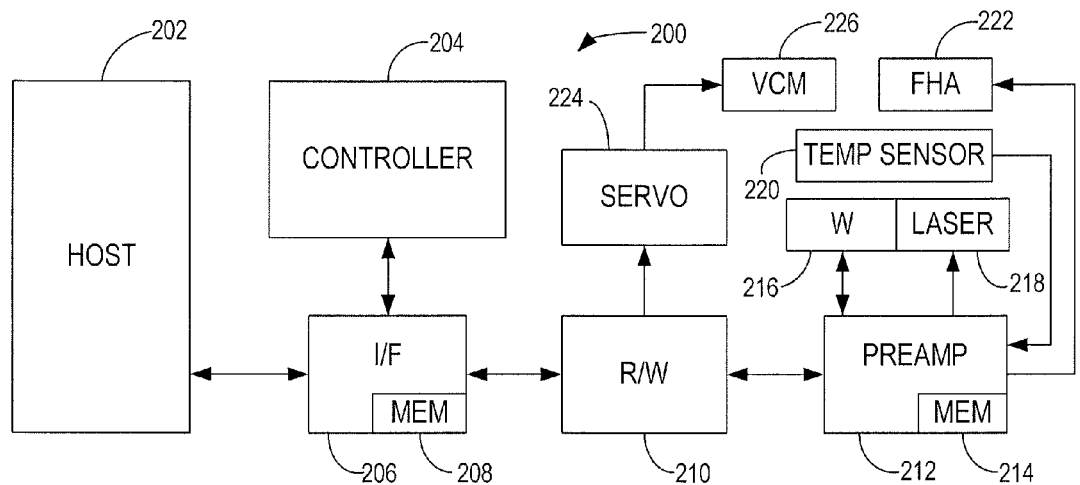
FIG. 8 provides a functional block representation of another data storage device constructed and operated in accordance with various embodiments.

FIG. 8 provides a functional block representation of a data storage device 200 similar to the devices 10, 100 discussed above. The data storage device 200 is contemplated as constituting a disc drive with multiple magnetic discs and associated recording heads, although it will be appreciated that the various embodiments disclosed herein can be practiced in drives having a single disc and/or a single head. The device 200 is operationally coupled to a host device 202, which may take a number of different forms such as a personal computer of an end user, a network component that enables the device 200 to communicate over a computer network, a portion of manufacturing testing equipment used during the fabrication and testing of the device 200, and so on.

The device 200 includes a controller 204 which provides top-level communications and control functions for the device. An interface (I/F) circuit 206 provides host communications of data and commands, and may include a local buffer memory 208. In some embodiments, the controller 204 is a programmable processor that uses programming instructions loaded to the memory 208.

A read/write (R/W) channel is depicted at 210 and can operate in a manner similar to that discussed in FIG. 4 during data transfers between the magnetic media and the host 202. A preamplifier/driver (preamp) 212 may be mounted in close proximity to the recording heads, such as on a side of the actuator assembly (see FIG. 1). The preamp 212 provides write and laser power driver functions during write operations, and read current and readback signal conditioning (preamplification) functions during read operations. The preamp 212 may include local preamp memory (mem) 214.

Each recording head may include a write (W) element 216, a laser diode or other write source 218, and a temperature sensor 220. One or more temperature sensors may be additionally or alternatively provided at other suitable locations within the device 200.

In some embodiments, each head may further include a fly height adjustment (FHA) mechanism 222, such as a heater element, that can be used to adjust the effective fly height clearance of the recording head adjacent the medium through thermal expansion effects. It will be appreciated that the applied power to the laser 218 may also serve to induce thermal expansion effects and can thus alternatively, or additionally, be used to adjust the fly height. The FHA mechanism may include disc contact detection capabilities, or disc contact may be detectable through other means such as via the read element (not separately shown).

A servo circuit 224 provides closed loop servo control of the recording heads using demodulated servo data from the servo wedges, and applies appropriate drive currents to a voice coil motor (VCM) 226.

Figure 9:
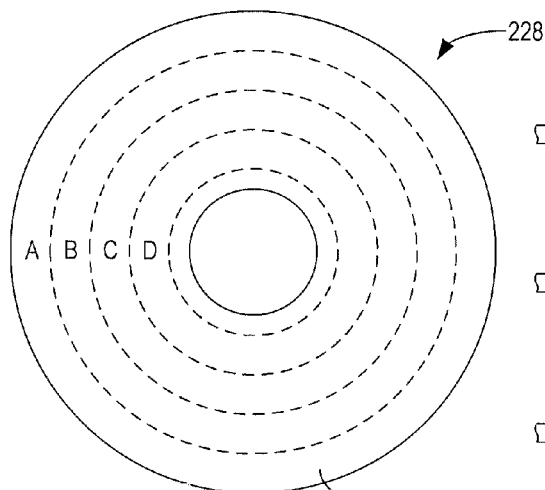
FIG. 9 depicts various concentric zones on a medium surface of the device of FIG. 8.

In some embodiments, appropriate laser power levels Lp may be selected for different radial zones of the media. FIG. 9 shows an exemplary data storage medium 228 of the device 200 on which four concentric zones 230, denoted as zones A, B, C and D, have been defined. Each zone 230 may correspond to a constant data recording zone in a zone-based recording (ZBR) environment, so that the same amount of user data are stored on each track in each zone. Alternatively, the zones 230 may be selected to cover a selected radius of the overall medium surface. Any number of zone can be selected, as desired.

Figure 10:
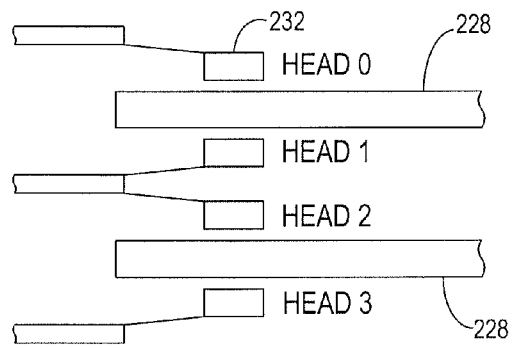
FIG. 10 is an elevational schematic depiction of multiple heads and media of the device of FIG. 8.

Appropriate laser power levels Lp may alternatively, or additionally, be selected for different heads within the system. FIG. 10 is an elevational schematic depiction of two axially aligned data storage media 228 accessed by four recording heads 232, denoted respectively as HEAD 0 to HEAD 3. The laser power levels may be individually tailored for each of these different heads 232.

Figure 11:
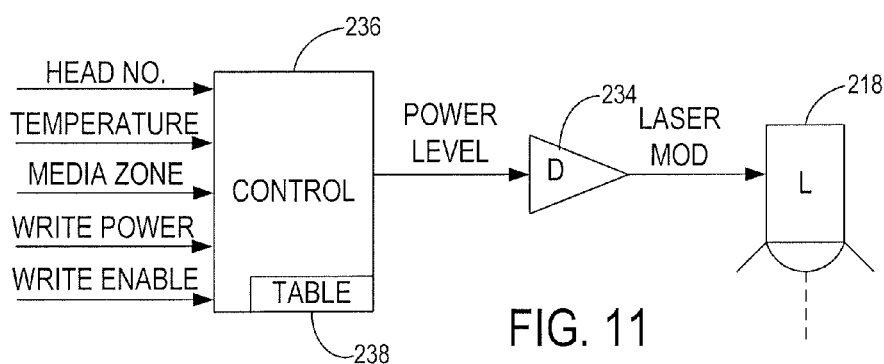
FIG. 11 provides a functional block representation of a control circuit that applies different laser power levels to a laser of the device of FIG. 8 responsive to different system settings and operational modes of the device.

FIG. 11 is a functional block representation of a laser driver 234 of the device 200 configured to modulate the laser 218 by application of a modulation signal thereto responsive to a power level input from a control circuit 236. The control circuit 236 selects the appropriate power level responsive to various system setting inputs associated with the existing operational conditions of the drive, such as the various exemplary inputs shown in FIG. 11 (head, media zone of interest, temperature, etc.). The control circuit 236 may reference a table 238 stored in associated memory to select the appropriate power level to the driver 234. Depending on the construction, the power level from the control circuit 236 may be expressed as a multi-bit digital value, and the laser modulation signal from the driver 234 may be an analog signal having specified current and/or voltage levels.

Figure 12:
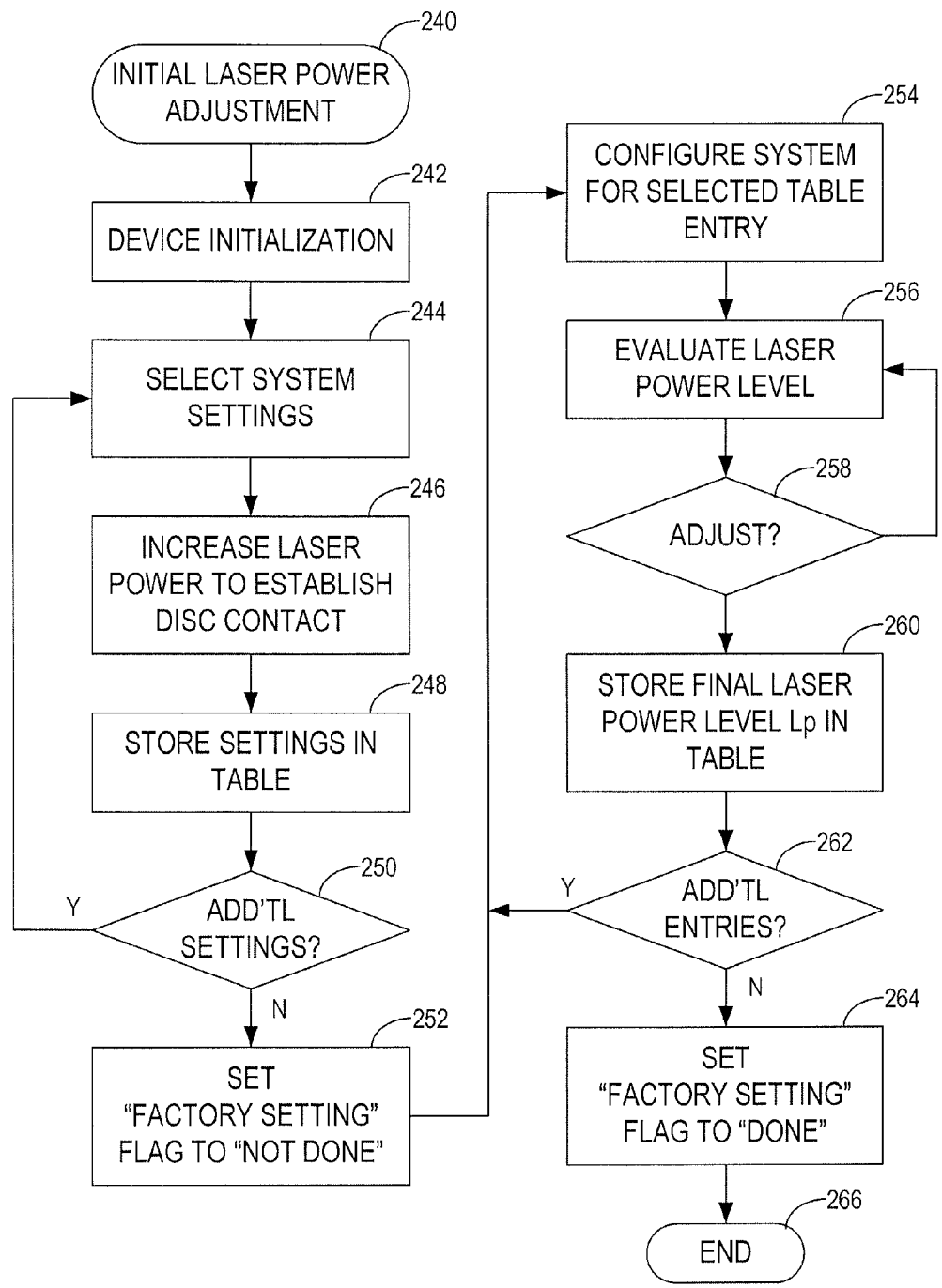
FIG. 12 is a flow chart for an INITIAL LASER POWER LEVEL ADJUSTMENT routine illustrative of steps carried out in accordance with various embodiments of the present invention to establish initial laser power levels for the device of FIG. 8.

FIG. 12 is a flow chart for an INITIAL LASER POWER LEVEL ADJUSTMENT routine 240, carried out in accordance with various embodiments. The routine 240 may be carried out using a device such as 200 in FIG. 8 to provide an initial set of laser power level values Lp for different system setting combinations such as different temperature settings, media zones and writer power levels. It will be appreciated that laser power level values Lp can be expressed in a variety of ways, such as power, voltage, current, etc. It is contemplated that the routine 240 will be carried out during manufacturing processing (factory set-up) of the device, although the routine can be performed at other suitable times.

The routine may be performed in a stand-alone fashion using suitable programming by an internal controller, such as controller 204, or may be carried out under the direction of an external device such as the host 200. It will be appreciated that the routine of FIG. 12 is merely exemplary and numerous alternatives and modifications to the routine will occur to the skilled artisan in view of the present disclosure.

The routine 200 is shown to begin with a device initialization step 242, during which the device 200 is placed into an operationally ready condition, including rotation of the media 228 and the loading of the heads 232. As desired, a maximum laser power value Lmax may be identified during this step. The Lmax value is a maximum power level that can be output by the laser driver to the laser diode.

At step 244, initial ambient temperature, media zone and writer power settings are identified. For example, a first time through the routine may result in HEAD 0 in FIG. 10 being positioned over ZONE A in FIG. 9, and various other system settings such as write power for the associated write element 216 (FIG. 8) may be established. Subsequent combinations of system settings will thereafter be evaluated in turn.

At step 246, laser power is applied to the laser 218 (FIG. 8) of the selected head, and this laser power is slowly increased until head/disc contact is detected. If the laser power reaches Lmax before the head makes contact with the medium, then the writer power (or other system setting) may be adjusted and this step repeated until contact is detected. If the head is over an operational location of the medium, care should be taken to ensure that the application of increased laser power does not inadvertently disturb existing servo data, etc.

At step 248, data values are temporarily stored in an entry in a lookup table in suitable memory (such as memories 208, 214 in FIG. 8) to record the results from the evaluation of step 246. These values may include the various settings such as ambient temperature, media zone, writer power, laser power, and laser voltage values which resulted in head contact. Alternatively, the data in each table entry may identify the maximum possible laser power level that can be applied under the other associated system settings so that the write head is not in contact with the disc. For example, the laser power may be increased until contact is detected, after which the laser power is decremented until contact is no longer detected, and this laser power level is recorded. Other values may be recorded in the table at this time as desired.

If additional settings are to be evaluated, the foregoing processing is repeated as indicated by decision step 250 until maximum laser power values are obtained for all desired combinations of settings. At this point, a "factory setting" indication signal (flag) is set to "not done" at step 252.

The routine continues at step 254 where the system is configured in accordance with a selected table entry from the table of step 248. As before, the laser power level for each of the different combinations of system settings will be evaluated in turn.

Data are next written to the medium during step 256 to evaluate the laser power level setting from the table. This can be carried out in a variety of ways as discussed below. As necessary, the laser power level setting may be adjusted, as shown by decision step 258, and step 256 repeated.

Once an appropriate final laser power level Lp has been identified, this value is updated in the table, step 260, and the process is repeated for each of the remaining table entries, as shown by step 262. Once appropriate final laser power level values have been determined for all desired system setting combinations, the factory setting signal flag is set to "done" at step 264, and the process concludes at step 266.

In some embodiments, the evaluation of step 256 can be carried out as follows. For each ambient temperature setting, media zone, and writer power in turn, the laser power value can be set to a level less than the level identified in the table, and with this setting the head is used to write one full revolution of data to the medium (such as in the associated user data sectors) using an appropriate repeating pattern, such as a low frequency 2T tonal pattern. The system 200 is next configured to transduce the written pattern during a read operation (having reduced the laser power as discussed above), while measuring various response parameters such as the peak narrow band amplitude and FWHM response of the written track.

This process is repeated for a succession of new tracks using successively incremented laser power levels until the maximum laser power level from the table is reached. Then, using the data accumulated from the foregoing steps, the final Lp value can be selected. For example, the Lp value may be selected as the maximum laser power level which supports a desired track density capability (TPIC) based on the FWHM response.

In another example, the evaluation of step 256 can be carried out using PseudoRandom Bit Sequence (PRBS) data. In such case, for each combination of system settings from the table, the writer current can be set to a nominal initial value, and the writer heater clearance can be set to a desired value. The head is next configured to write three full revolutions of the medium using PseudoRandom Bit Sequence (PRBS) data to three adjacent tracks (with the center track written first followed by the two adjacent tracks). From this, a system linear density capability (BPIC) and a track density capability (TPIC) can be evaluated by sweeping through different squeeze, data rate, and off-track values.

If the laser write driver current Ip is less than a predetermined Ipmax and the BPIC and TPIC values are not within an acceptable range, the laser write driver current can be increased by a fixed predetermined amount and the foregoing operation repeated until an appropriate Lp value is identified that provides acceptable BPIC and TPIC values. if Ip=Ipmax and the BPIC and TPIC remain unacceptable an error may need to be reported and other parameters changed, such as different write current and/or head clearance values.

In still further embodiments, a suitable algorithm can be used for some combinations of system settings identified during the evaluation to calculate suitable Lp values for other combinations of settings. It will be appreciated that the final Lp values can be evaluated and confirmed in a variety of other ways in view of the present discussion, so the foregoing examples are merely illustrative and not limiting.

The factory setup table will thus provide initial appropriate laser power levels for different combinations of system settings. Depending on the configuration of the system, these laser power levels may be expressed as laser power levels Lp, laser voltages Lv, and/or laser currents Lc. These factory settings can be stored in any suitable location, such as in a guardband on one of the media surfaces, and can be loaded to a suitable local memory (such as 208, 214) for access during system operation. For example, for a given write operation, the table can be accessed to identify the appropriate laser power level. Such operation may include reference to other system inputs, such as ambient temperature readings from one or more temperature sensors. The appropriate laser power level Lp is then applied as discussed above in FIG. 6 to write data to the medium.

The initial power levels obtained by the routine 240 in FIG. 12, hereinafter sometimes referred to as the "factory settings," can thereafter be used during normal operation of the device, However, in further embodiments, the initial power levels obtained during FIG. 12 are be evaluated and, if necessary, adjusted at other times, such as each time the device 200 is initialized.

Figure 13:
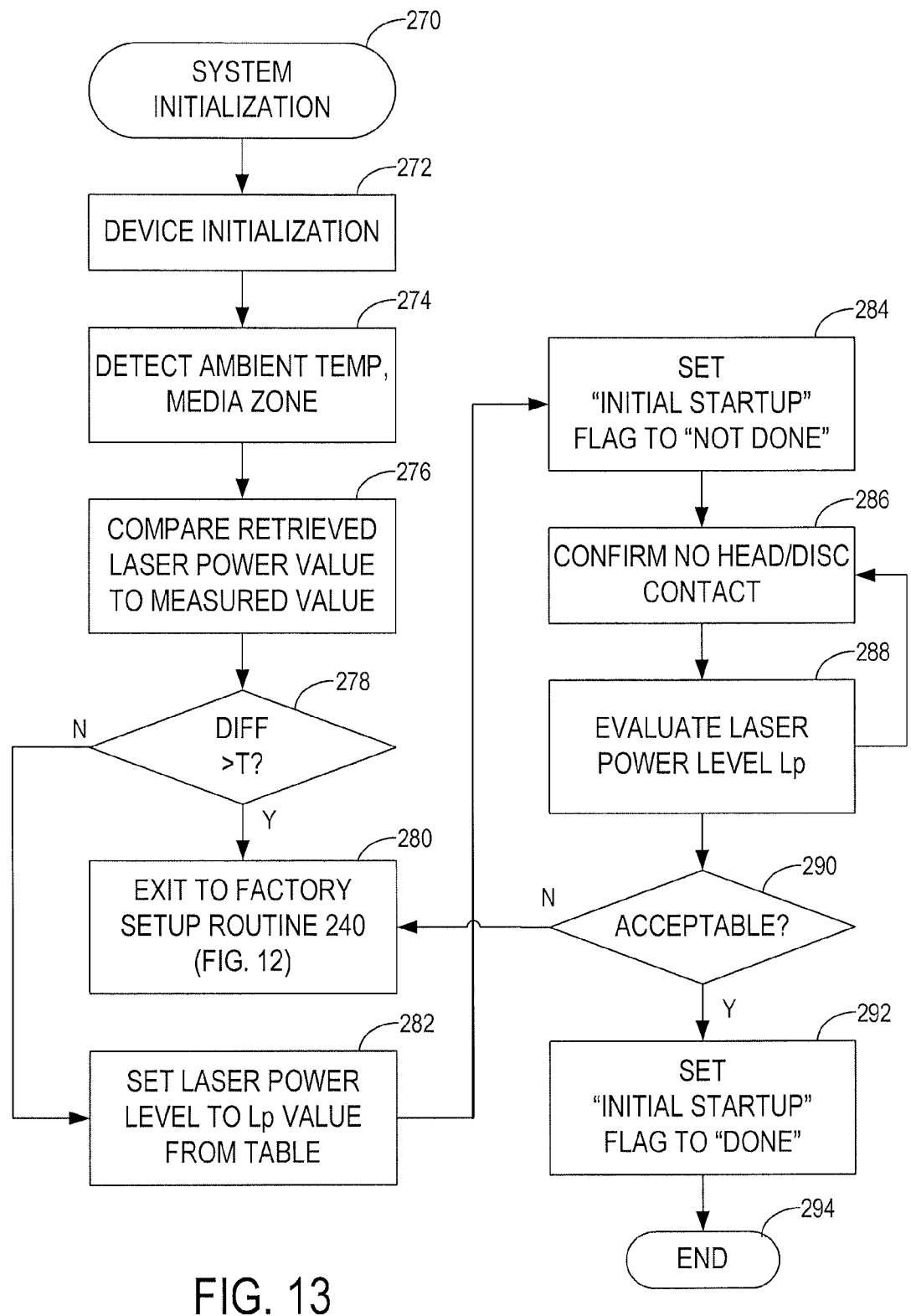
FIG. 13 is a flow chart for a SYSTEM INITIALIZATION routine that can be carried out to adjust the laser power levels during system initialization.

FIG. 13 provides a flow chart for a SYSTEM INITIALIZATION routine 270 to illustrate steps carried out in some embodiments. The routine 270 may be carried out during device initialization (startup) to verify the then-existing Lp values. As before, it is contemplated that the routine will be carried out using suitable programming provided to an internal controller such as the controller 204, although such is not necessarily required. The routine 270 is merely exemplary and variations and modifications will readily occur to the skilled artisan in view of the present disclosure.

The device 200 is first initialized at step 272. It is contemplated that this may occur responsive to the application of power to the device to transition it from a deactivated to an activated state, and will include the commencement of disc rotation and the loading of the heads as before. At step 274, one or more ambient temperature readings are detected and a media zone of interest is identified.

As desired, an initial verification of the then-existing factory settings can be carried out at step 276 by comparing, for example, a laser voltage value from the lookup table to a measured laser voltage in the system. Other values can be compared as well. If the difference between the measured value and the value read from the lookup table is larger than a predefined value, step 278, then the factory setting flag may be set to "not done," and appropriate portions of the factory setup routine 240 of FIG. 12 may be carried out to obtain an appropriate table value, step 280.

Continuing with the routine 270, the laser power level Lp is next set to the value in the lookup table at step 282, and an "initial startup" signal (flag) is set to "not done" at step 284. At step 286, a system check is made to ensure the associated head is not in contact with the media. If it is, various system adjustments may be made to remedy this condition, including an adjustment to the FHA circuitry.

The selected laser power level Lp is next evaluated at step 288. This can be carried out in a variety of ways. In some embodiments, data are written to the medium using the associated head by writing three full revolutions of PseudoRandom Bit Sequence (PRBS) data at three adjacent tracks. As before, the center track can be written first followed by the adjacent tracks. The system bit linear density capability (BPIC) and track density capability (TPIC) can then be evaluated by sweeping through different squeeze, data rate, and off-track values.

If the evaluation of step 288 is found acceptable, as shown by decision step 290, the flow continues to step 292 where the initial startup flag is set to "done" and the routine ends at step 294. On the other hand, if the evaluation of step 288 provides unacceptable results, the factory setup flag is set to "not done" and the routine exits to the factory setup routine as before, step 280. While the initialization routine 270 is shown to only evaluate one particular combination of settings, it will be appreciated that the various steps can be repeated as desired. For example, one set of settings for each head can be evaluated at initialization to confirm the table settings. Alternatively, every table entry can be evaluated, or some portion thereof.

It will be appreciated that the routine 270 of FIG. 13 provides a convenient way for the previously determined Lp levels to be evaluated and confirmed, thereby helping to ensure that appropriate laser power levels will be employed during subsequent operation. However, in further embodiments, periodic evaluations of the various settings are further carried out at appropriate times during ongoing operation of the device 200.

FIG. 14 shows a flow chart for a NORMAL OPERATION routine 300, carried out to evaluate the various laser power levels Lp during normal operation of a device such as 200 at appropriate times. It will be appreciated that the routine is useful to account for different temperature and other environmental condition changes (e.g., relative humidity, etc.) that take place over time, as well as other system changes such as component aging and other effects.

As before, the routine 300 may be carried out by a suitable controller such as the controller 204 using associated programming. The routine may be initiated on a periodic scheduled basis (e.g., once a day or after a predetermined accumulated amount of I/O processing, etc.). The routine may also be carried out as a part of general background system optimization efforts during idle times or periods of relatively low host processing requirements.

The routine may further be initiated responsive to the detection of particular system trends, such as an increase in overall data error rate levels, channel quality measurements, periods of elevated temperature, etc. It will be noted that a specific error recovery routine is separately discussed below suitable for use during an error recovery mode. As before, various alternatives and modifications will readily occur to the skilled artisan in view of the present discussion.

As shown by step 302, periodic temperature measurements may be taken, and such measurements may result in the evaluation of one or more of the Lp table values. As before, a verification process can take place at step 304 whereby a then existing laser power value from the table is compared to a measured laser value. If the difference in these respective values exceeds a predetermined threshold T, as shown by step 306, the factory setup signal flag can be set to "not done", and the routine can exit to repeat appropriate portions of the factory setup routine to arrive at an appropriate table value, step 308, as before.

If the comparison from step 306 results in an acceptable result, in some embodiments no further processing may take place, and the normal processing ends at this point. Alternatively, additional processing may be applied as desired such as shown by step 310, which involves the temporary setting of a "regular check" signal flag to a "not done" status level for that laser power level Lp.

An evaluation of the associated laser power level Lp next takes place at step 312. This can be carried out as discussed above in steps 286 and 288 of FIG. 13, or other evaluation steps can be taken. Should an unacceptable result be identified, the routine will exit and execute appropriate portions of the factory setup routine 240 as shown. If the existing laser power level is found to be acceptable, the regular check signal flag is transitioned to a "done" status at 314, and the routine ends at 316.

An ERROR RECOVERY routine 320 is set forth by FIG. 15. This routine may be useful at times when a particular frequency of monitored error recovery operations exceeds a predetermined threshold. As will be appreciated, devices such as 200 can be provisioned with error detection and correction (EDC) capabilities such that the application of error correction codes (ECC) allow the detection and correction of up to a selected number of errors in the readback data. Such EDC circuitry may be provided in the R/W channel or interface portions of the system, or may be applied directly by the controller.

So long as the number of detected errors in a set of readback data can be successfully corrected, substantially no impact is made upon the host device. However, a trend of increased utilization of ECC to correct errors (and other error recovery efforts by the device) may signal the need to execute the routine 320. It is contemplated that the routine will be executed before the level and frequency of detected errors increases to the point that host data stored to the media cannot be recovered due to the presence of uncorrectable errors.

Step 322 shows operation of the device 200 in detecting an adverse trend of readback errors sufficient to trigger further recovery processing for a particular head. Such processing entails the setting of a "laser recovery check" signal flag to "ON" at step 324, the measurement of ambient temperature at step 326, the retrieval of the Lp table value for the current settings and the associated head at step 328, and the evaluation of the Lp table value at step 330. This latter step can be carried out as discussed above, or in any suitable manner. As before, if the results are unacceptable, decision step 332, the routine will exit back to the factory setup process as shown at step 334 in order to derive a new appropriate Lp value. If the results are acceptable, then the laser check signal flag is reset to "OFF" at step 336.

At this point it will be appreciated that some other cause for the increased errors may be at work, and the system may undertake other steps to uncover and correct the situation. Nevertheless, having determined that the laser power setting for this particular head and for these particular associated settings is at an appropriate level, this setting will continue to be used to write additional host data. However, because of the continued risk of the loss of user data, the routine will continue at step 338 to set a "HAMR IRAW" signal flag (idle read after write) to "ON", which will initiate further data integrity operations to ensure received writeback data are properly written at step 340, such as through the use of read-write-verify processing.

In some embodiments, the setting of the HAMR IRAW flag to "ON" will result in the next X number of data sectors being written to a non-volatile memory location after a write, and the reading of those written sectors during an idle drive time to confirm that they are written correctly. The value X can be set to match the frequency of error recovery operations as monitored in step 322. For example, if error recovery is needed every other 1000 sectors, X can be set to a value of 1000. Other data integrity operations can be employed as desired.

Once the increased frequency of recovery errors has been addressed, the HAMR IRAW flag can be returned to a status of "OFF", step 340, and the routine ends at step 342.

Figure 16:
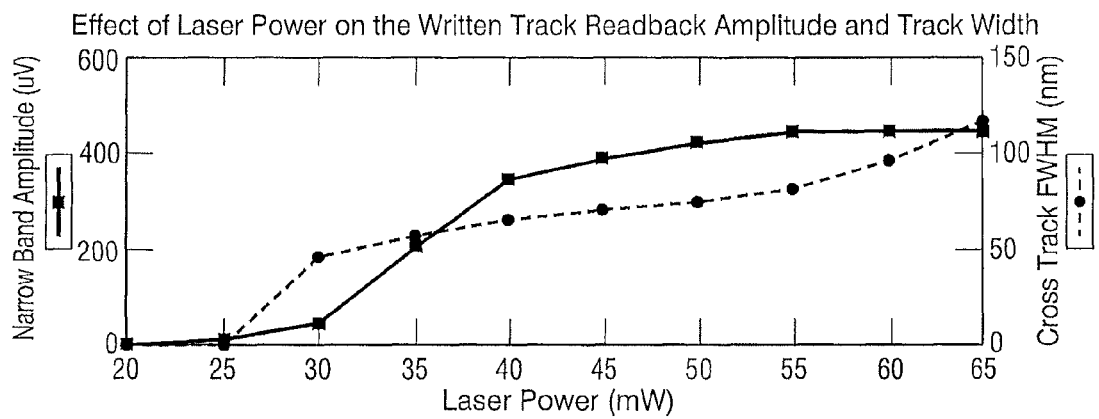
FIG. 16 shows an example of the effect of laser power on the amplitude and width of recorded tracks.

In each of the foregoing routines, any number of metrics can be used to monitor recording quality. For example, instead of BPIC and TPIC, one might use signal amplitude, track width, or any number of channel quality metrics. FIG. 16 shows an example of the effect of laser power on the amplitude and width of recorded tracks using FWHM response. It is contemplated that controlling the laser power levels as described above can operate to improve the performance of the drive and also enhance the reliability and operational life of the drive.

Figure 17:
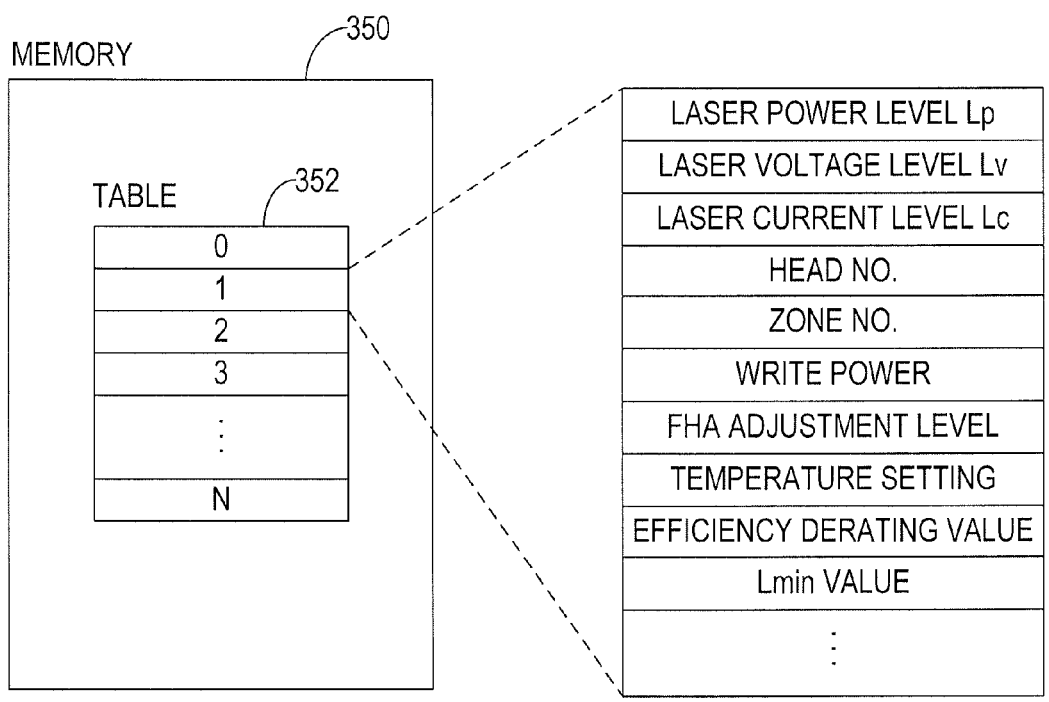
FIG. 17 provides an exemplary format for a lookup table useful during the routines of FIGS. 12-15.

The lookup table used to store the various system settings can take any suitable data structure and format. FIG. 17 shows a physical memory 350 within the device 200 adapted to store an exemplary table structure 352 as a sequence of entries 0-N. Each entry in turn may have a variety of fields to store data values such as, but not limited to, a laser power level Lp, a laser voltage level Lv, a laser current level Lc, a head number (e.g., HEAD 0-3), a zone number (e.g., ZONE A-D), a temperature (or temperature range), and so on. Other formats will readily occur to the skilled artisan in view of the present disclosure. Multiple entries, or even multiple tables, may be provided to facilitate ease in retrieving the desired value (e.g., Lp) based on one or more input values.

Figure 18:
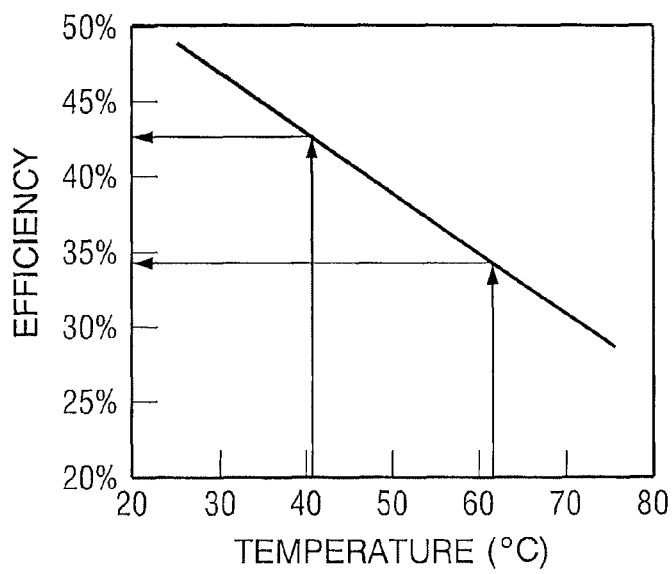
FIG. 18 is a graph of laser efficiency versus temperature.

In still further embodiments of the present invention, appropriate laser power levels Lp can be identified and/or modified on a head and/or zone basis. It has been observed by the inventors that the efficiency of a laser diode as disclosed herein can depend on ambient temperature. That is, the higher the temperature, the lower the diode efficiency. FIG. 18 shows data for an exemplary laser wherein the output efficiency decreases with ambient temperature.

As noted previously, a data storage device such as 10, 100, 200 can employ multiple discs and heads to increase its overall data storage capacity, such as depicted in FIG. 10. Heads at different locations within the drive, and at different locations with respect to a disc, may be found to operate at different localized temperatures for a given overall ambient temperature level.

More specifically, the intermediate heads 232 in FIG. 10 (HEADS 1 and 2) located in the space between the respective discs 228 may operate at a higher temperature than the HEADS 0 and 3 located above and below the disc stack. Specifically, at a given time, it has been found that the ambient temperature in the vicinity of the inner HEADS 1-2 may be about 20° C. higher than the ambient temperature in the vicinity of the outer HEADS 0 and 3. A variety of factors may contribute to this differential, including on the basis that the inner heads may receive relatively less airflow than the outer heads, etc.

Using the relationship shown in FIG. 18, an outer head may be found to operate at an ambient temperature of about 42° C., while at the same time an inner head may operate at an ambient temperature of about 63° C. This temperature differential may result in a reduction in laser diode efficiency on the order of about 8%, as shown by the graph.

The decreased laser efficiency experienced by the inner head requires more laser input power to compensate for this reduction in efficiency. However, increasing the input power to the laser may in turn tend to generate more heat within the laser, and further reduce the laser efficiency. Moreover, heat generated by other elements within an inner head, such as the write element or a FHA heater, can further contribute to increased laser operating temperature and corresponding decreased laser efficiency.

It has further been observed by the present inventors that a given head may be subjected to different ambient temperatures as it moves radially across the associated disc surface. Differences on the order of about 5° C. to 10° C. have been observed across the stroke (disc radius) between the innermost diameter (ID) and the outermost diameter (OD), so that heads operate hotter in some areas (such as outermost ZONE A in FIG. 9) as compared to other areas (such as innermost zone D in FIG. 9). As before, the increased temperature of the laser diode may result in decreased efficiency.

Accordingly, further embodiments of the present invention operate to adjust laser power levels to take these and other factors into account. In some embodiments, a lookup table can be constructed such as set forth above in FIG. 17 for different head and zone combinations. The table can be adapted to include laser efficiency values correlated to temperature, such as shown in Table I.

TABLE I

| Head | Temp (° C.) | Laser Efficiency | Laser power (mW) |
|---|---|---|---|
| 0 | 42 | 42% | 100 |
| 1 | 63 | 34% | 124 |
| 2 | 63 | 34% | 124 |
| 3 | 43 | 42% | 100 |

Circuitry in the drive can be used to store information of head, zone, temperature, laser efficiency and adjusted laser power. These data may reside in the preamp 212 (FIG. 8) and can be used to automatically adjust the laser power according to the location and position of the head. Temperatures at different head locations and zones can be obtained by an on-head thermal sensor such as 220, which can be a temperature sensor located close to the laser 218. The laser power can then be adjusted based on relationship between temperature and laser efficiency represented by the lookup table data. The lookup table may further include data relating to the head position (e.g., zones A-D in FIG. 9).

In an alternative embodiment, appropriate laser power levels Lp can be established using an empirical formula of laser input power as a function of head, zone, and temperature. Coefficients relating to particular head, zone, and temperature combinations can be determined empirically during a drive setup process such as 240 in FIG. 13. These coefficients can then be stored in memory and used to adjust the laser input power. The laser power can then be adjusted based on a temperature-dependent laser efficiency curve representing laser power as a function of head, zone, and temperature.

Before drive operation, laser power vs. temperature can be determined for each head. The head thermal sensor 218 can be used to measure the temperature. Alternatively, temperature readings can be taken from a central temperature sensor to obtain a localized reading, which is then correlated to the individual temperatures of the heads using a relation such as in FIG. 18. The power vs. temperature data can be stored in a look up table or a transfer function can be determined and implemented in firmware.

The laser temperature can be monitored during drive operation for each disc surface at each zone. Then the laser driving power for each head can be adjusted to improve laser performance for each disc surface.

The various embodiments disclosed herein can be readily adapted to any number of different types of laser and heat-assisted recording systems, so the various embodiments are merely exemplary and not limiting to the claimed subject matter. References to light will be understood broadly to describe any number of forms of electromagnetic radiation regardless of frequency spectrum.

While various embodiments of the present invention have been disclosed herein, it will be apparent to those skilled in the art that numerous changes can be made to the described examples without departing from the scope of the invention as set forth in the following claims. The implementation described above and other implementations are within the scope of the following claims.

What is claimed is:

1. A method comprising:
driving a light source of a data recording head at a first power level to irradiate a first sector on a track defined on an adjacent storage medium, the first power level insufficient to alter a magnetization state of the first sector;
transitioning the light source to a higher, second power level to irradiate a second sector on the track during the writing of data to said second sector using a magnetic transducer of the data recording head, the second power level sufficient to facilitate an altering of said magnetization state of the medium by the magnetic transducer, wherein the first and second sectors are irradiated at the respective first and second power levels during a single rotation of the medium; and
providing a plurality of data recording head/storage medium combinations, wherein the second power level of the transitioning step is individually optimized for each said head/medium combination, and the first power level of the driving step is a common, non-zero power level for each head/media combination.

2. The method of claim 1, wherein the first sector and the second sector are each characterized as data sectors adapted to store user data from a host device, the first sector immediately preceding the second sector on the track.

3. The method of claim 1, wherein the first sector is a servo sector which stores servo data used by a servo control circuit to position the data recording head with respect to the track, wherein the second sector is a data sector configured to store user data from a host device, and wherein the first sector precedes the second sector on the track without another servo sector disposed therebetween.

4. The method of claim 1, further comprising detecting an ambient temperature of the data recording head and selecting a magnitude of the second power level responsive to said detected temperature, wherein different magnitudes of power level are applied responsive to different detected temperatures.

5. The method of claim 1, further comprising detecting a radial location of the data track on the storage medium, and selecting a magnitude of the second power level responsive to said radial location, wherein different magnitudes of power level are applied responsive to different radial locations.

6. The method of claim 1, wherein the data recording head further comprises a fly height heater, and the transitioning step further comprises applying a selected power value to the fly height heater to adjust a fly height of the data recording head during the writing of data to the second sector.

7. The method of claim 6, wherein the second power level is adjusted responsive to the selected power value applied to the fly height heater and to a detected ambient temperature.

8. The method of claim 1, wherein the storage medium is a bit patterned medium (BPM).

9. An apparatus comprising:
    first, second, third and fourth data recording heads coupled to a moveable actuator to move said data recording heads adjacent respective upper and lower recording surfaces of axially aligned, first and second recording discs so that the first data recording head is proximate the upper recording surface of the first disc, the fourth data recording head is proximate the lower recording surface of the second disc, and the second and third data recording heads are disposed between the first and second discs, wherein each said data recording head comprises a light source and a magnetic transducer; and
    a control circuit adapted to respectively drive each of the light sources of the first, second, third and fourth data recording heads at lower power levels to irradiate the associated recording surfaces, the lower power levels insufficient to alter a magnetization state of the associated recording surfaces, the control circuit further adapted to transition the respective light sources to higher power levels to respectively irradiate the associated recording surfaces during the writing of data using the magnetic transducers of the data recording heads, the higher power levels sufficient to facilitate an altering of the magnetization state of the associated recording surfaces, wherein a magnitude of the higher power levels applied to the second and third data recording heads is greater than a magnitude of the higher power levels applied to the first and fourth data recording heads.

10. The apparatus of claim 9, further comprising a spindle motor configured to rotate the first and second discs about a common central axis at a selected velocity, and the control circuit respectively applies the associated lower and higher power levels to a selected one of the first, second, third or fourth data recording heads during a single rotation of the spindle motor.

11. The apparatus of claim 9, wherein the higher power levels of the first and fourth data recording heads are each equal to a first value, and the higher power levels of the second and third data recording heads are each equal to a second value greater than the first value.

12. The apparatus of claim 9, wherein the higher power level applied to the second data recording head is different from the higher power level applied to the third data recording head.

13. The apparatus of claim 9, further comprising a preamplifier/driver circuit connected to the respective first, second, third and fourth data recording heads, the preamplifier/driver circuit comprising a memory which stores the respective lower power levels and the higher power levels respectively applied to the light sources of the first, second, third and fourth data recording heads.

14. The apparatus of claim 9, wherein the first and second discs are characterized as bit patterned media (BPM).

15. The apparatus of claim 9, further comprising a solid-state non-volatile memory, wherein the control circuit is further configured to detect an increase in read errors from at least a selected one of the recording surfaces of the first or second discs, to temporarily disable operation of the associated magnetic transducer and direct storage of write data to the solid-state non-volatile memory in lieu of storage to the selected one of the recording surfaces, to adjust the higher power level for the associated magnetic transducer associated with the selected one of the recording surfaces to a new value, and to subsequently direct a transfer of the write data from the solid-state non-volatile memory to the selected one of the recording surfaces using the new value for the higher power level.

16. The apparatus of claim 9, further comprising a memory which stores the upper and lower power levels for each of the first, second, third and fourth data recording heads, wherein the control circuit retrieves the upper and lower power levels from the memory during a write operation.

17. The apparatus of claim 9, further comprising a temperature sensor which measures an ambient temperature, the control circuit adjusting the respective higher power levels responsive to the measured ambient temperature.

18. A method comprising:
    establishing a baseline power level for a light source of a data recording head by writing data to a first evaluation track on an adjacent storage medium at a maximum power level that can achieve writing of a pattern to the first evaluation track without establishing contact between the data recording head and the medium;
    subsequently determining a second power level by reducing the baseline power level, subsequently writing data to a second evaluation track, and measuring a response parameter from the second written evaluation track at the reduced baseline power level;
    driving the light source at a lower, first power level to irradiate a first sector on a track defined on the medium, the first power level insufficient to alter a magnetization state of the first sector; and
    transitioning the light source to the second power level to irradiate a second sector on the track during the writing of data to said second sector using a magnetic transducer of the data recording head, the second power level sufficient to facilitate an altering of said magnetization state of the medium by the magnetic transducer, wherein the first and second sectors are irradiated at the respective first and second power levels during a single rotation of the medium.

19. The method of claim 18, further comprising detecting an ambient temperature of the data recording head and selecting a magnitude of the second power level responsive to said detected temperature, wherein different magnitudes of power level are applied responsive to different detected temperatures.

20. The method of claim 18, further comprising detecting a radial location of the data track on the storage medium, and selecting a magnitude of the second power level responsive to said radial location, wherein different magnitudes of power level are applied responsive to different radial locations.

21. The method of claim 18, wherein the data recording head further comprises a fly height heater, and the transitioning step further comprises applying a selected power value to the fly height heater to adjust a fly height of the data recording head during the writing of data to the second sector.

22. The method of claim 21, wherein the second power level is adjusted responsive to the selected power value applied to the fly height heater and to a detected ambient temperature.

23. A method comprising:
- driving a light source of a data recording head at a first power level to irradiate a first sector on a track defined on an adjacent storage medium, the first power level insufficient to alter a magnetization state of the first sector;
- transitioning the light source to a higher, second power level to irradiate a second sector on the track during the writing of data to said second sector using a magnetic transducer of the data recording head, the second power level sufficient to facilitate an altering of said magnetization state of the medium by the magnetic transducer, wherein the first and second sectors are irradiated at the respective first and second power levels during a single rotation of the medium;
- setting a flag value responsive to an increase in read errors as data are read back from the storage medium;
- temporarily storing subsequently received write data in a solid-state non-volatile memory responsive to the setting of the flag value;
- adjusting the second power level to a new value; and
- subsequently transferring the received write data from the solid-state non-volatile memory to the storage medium using the new value for the second power level.

* * * * *